Oct. 6, 1964
T. E. DAUGHERTY
3,151,431
COTTON RAKE
Filed Oct. 12, 1962
3 Sheets-Sheet 1
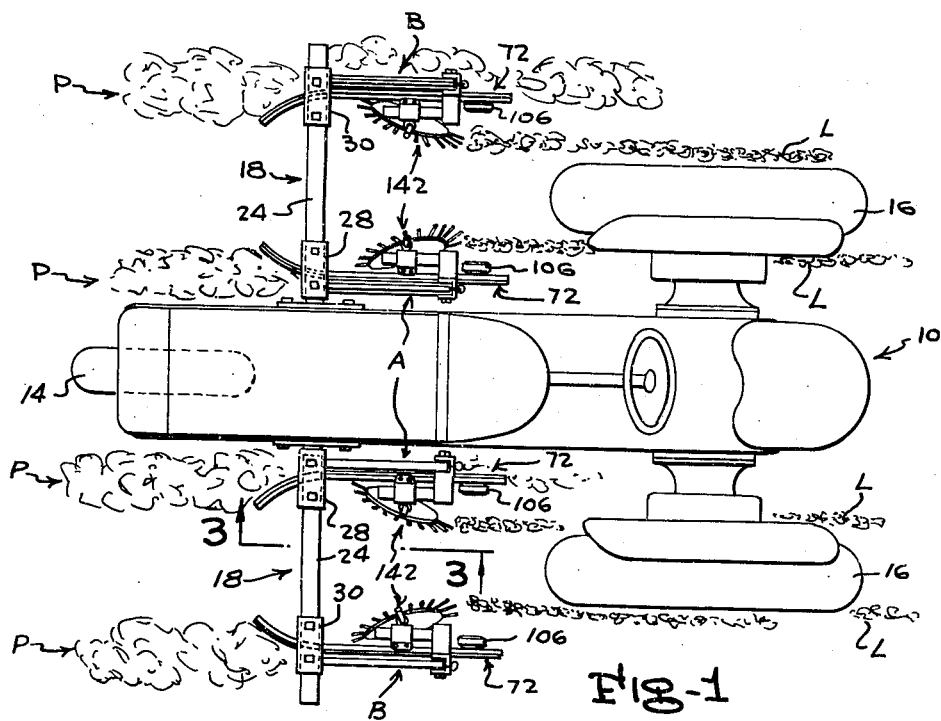
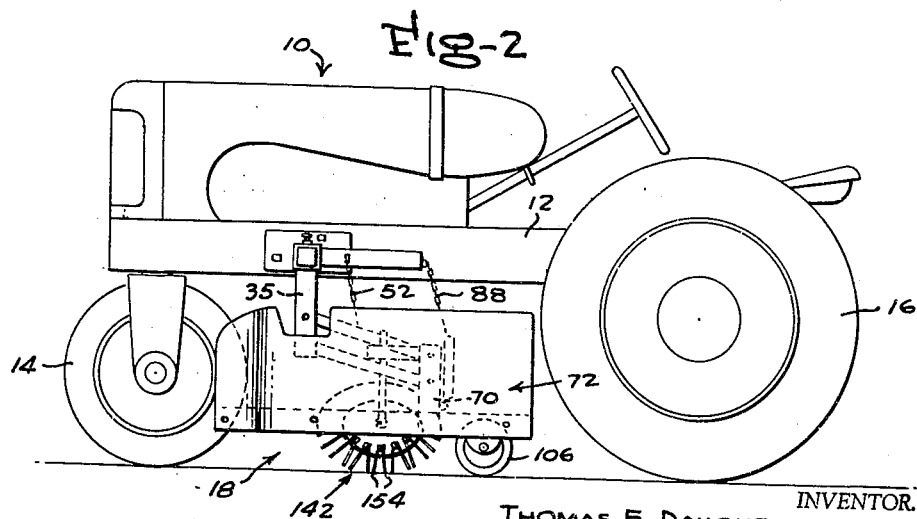
INVENTOR.
THOMAS E. DAUGHERTY
BY
McMorrow, Berman & Davidson
ATTORNEYS

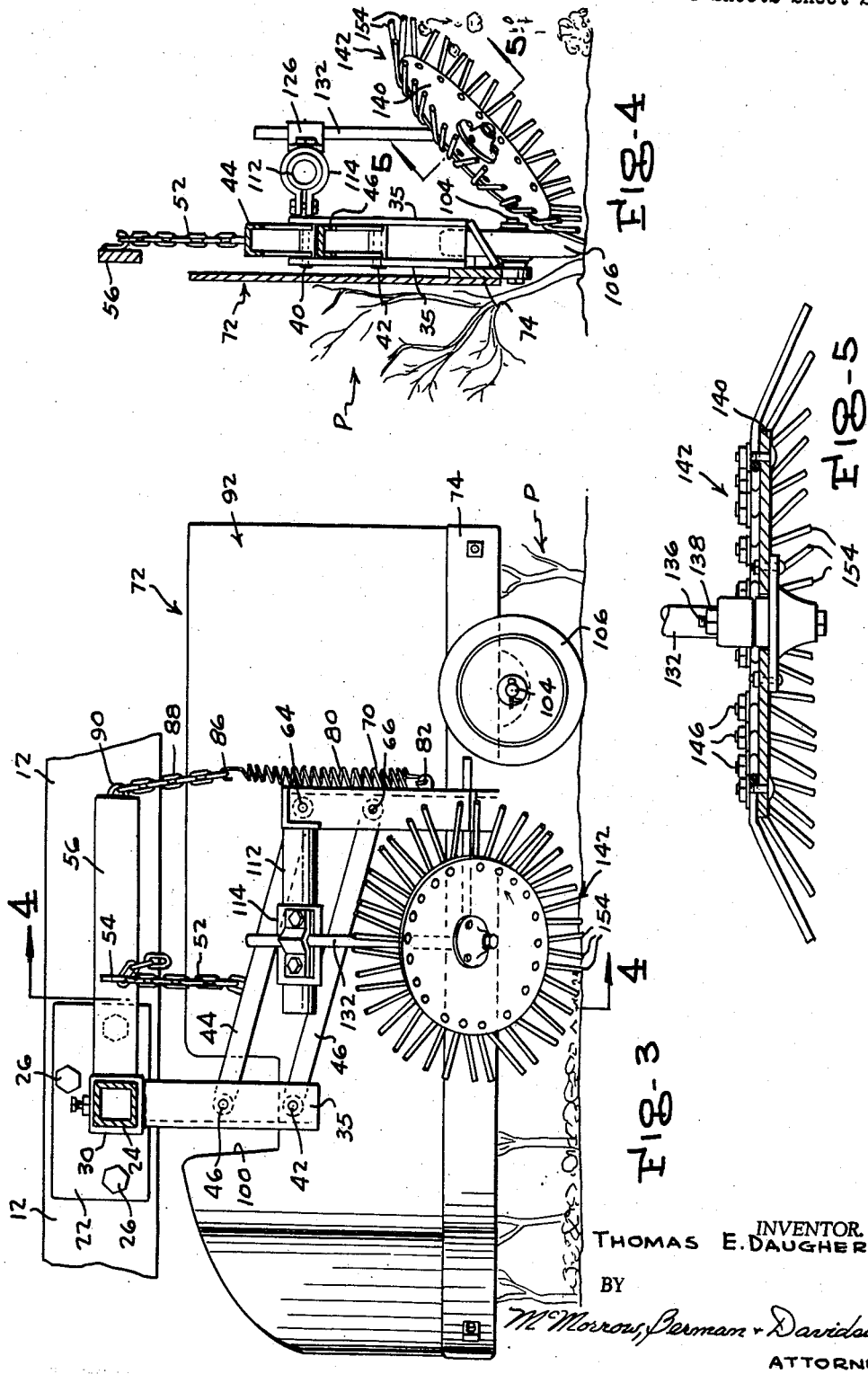

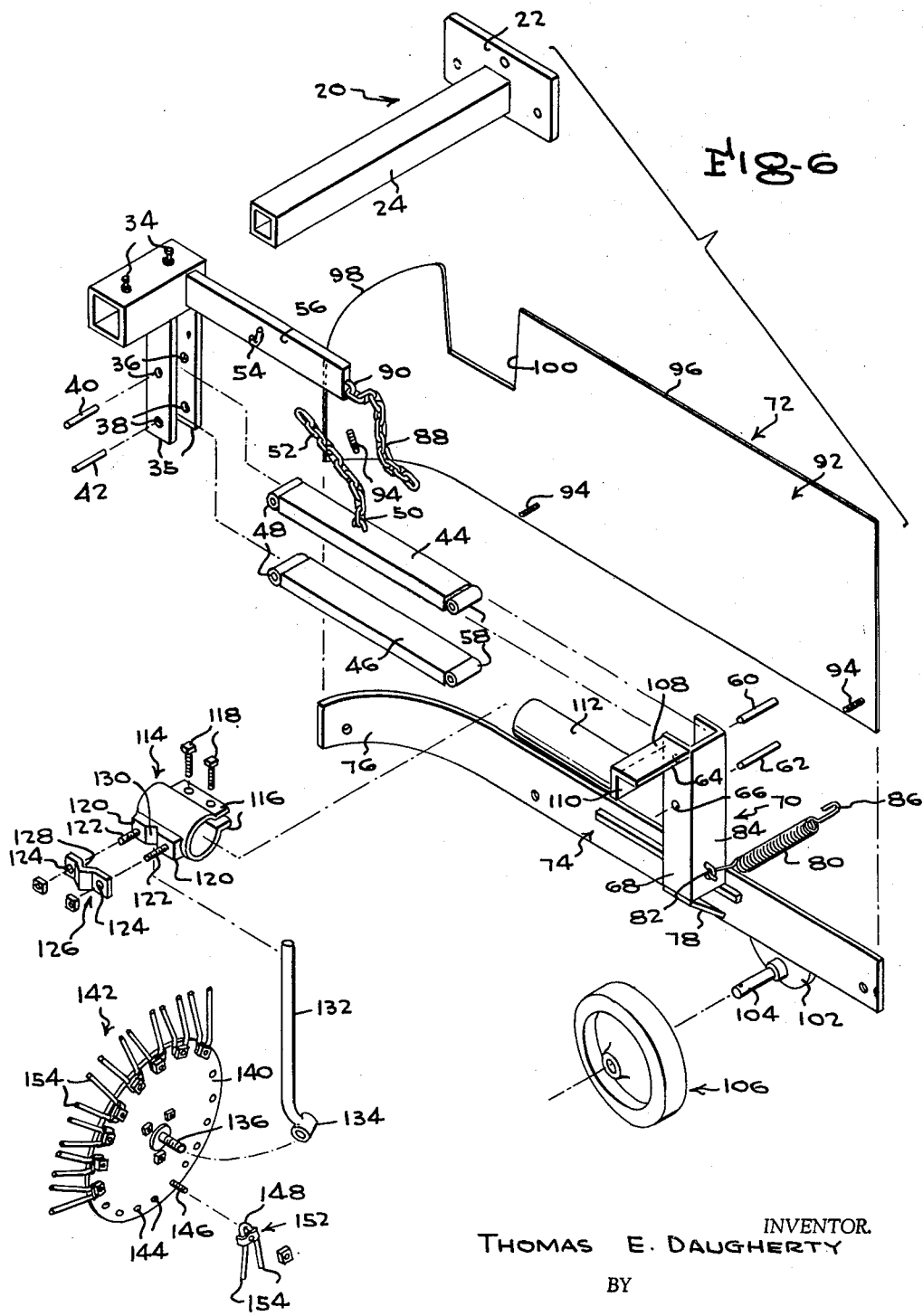

United States Patent Office 3,151,431
Patented Oct. 6, 1964

3,151,431
COTTON RAKE
Thomas E. Daugherty, 701 N. Olive Drive, Apt. 4,
Casa Grande, Ariz.
Filed Oct. 12, 1962, Ser. No. 230,156
7 Claims. (Cl. 56—28)

This invention relates to a novel cotton rake for picking up fallen cotton from the ground next to cotton plants and depositing this cotton on the ground between adjacent rows of cotton plants, so that a following pick-up machine can pick up the deposited cotton.

The primary object of the invention is the provision of a simple, efficient, and reliable device of the kind indicated above, adapted to be carried by a tractor or mounted on the front of a cotton pick-up machine, which operates to shield the cotton plants in adjacent rows as fingered wheels pick up cotton from the ground next to the plants and deposit this cotton on the ground at locations spaced laterally from the rows, the contact of the wheels with the ground serving to rotate the same whereby more of such cotton can be picked up by a pick-up machine, in a single pass, than can be ordinarily done in several passes of the machine, thereby making savings in time, labor, tractor fuel, and wear and tear upon the equipment.

Another object of the invention is the provision of a device of the character indicated above, which, with relation to two pairs of rows of cotton plants, has two pairs of cotton plant shields, with two opposed finger-equipped wheels supported between each pair of shields, the axes of the wheels being canted away from the shields and in rearwardly convergent relationship, and the fingers of the wheels being angled laterally inwardly relative to planes normal to the axes of the wheels whereby the fingers engage the ground substantially perpendicular thereto.

Other important objects and advantageous features of the invention will be apparent from the following description and the accompanying drawings, wherein, for purposes of illustration only, a specific form of the invention is set forth in detail.

In the drawings:

FIGURE 1 is a schematic top plan view showing a tractor-carried device of the present invention, in operative relation to two pairs of adjacent rows of cotton plants;

FIGURE 2 is a left-hand side elevation of said device, hidden components of the device being shown in phantom lines;

FIGURE 3 is an enlarged fragmentary vertical longitudinal section taken on the line 3—3 of FIGURE 1;

FIGURE 4 is a fragmentary vertical transverse section taken on the line 4—4 of FIGURE 3;

FIGURE 5 is an enlarged fragmentary section taken on the line 5—5 of FIGURE 4; and FIGURE 6 is an exploded perspective view of one of the sections of said device.

Referring in detail to the drawings, wherein like numerals designate like parts throughout the several views, the illustrated device is a tractor-borne form thereof, which comprises a tractor 10 having a horizontal frame which includes side members 12 and is supported by a front steering wheel 14 and rear drive wheels 16.

The illustrated device further comprises two similar rake sections 18, which are mounted to the tractor 10, on related frame side members 12 thereof, are transversely aligned with each other, and are positioned between the front wheel 14 and the drive wheels 16.

Each section 18 comprises a bracket 20 composed of a vertical longitudinal mounting plate 22 and a horizontal transverse, rectangular cross section arm 24, the plate 22 being fixed to the related tractor frame side member 12, as by means of bolts 26. A pair of inboard and outboard sleeves 28 and 30, respectively, are slidably but non-rotatably engaged on the bracket arm 24, and are adapted to be adjusted along this arm for spacing apart, at required adjustable distances from each other, in accordance with the distances between adjacent cotton plants P. A pair of similar but reversed inboard and outboard rake assemblies A and B, respectively, are operatively mounted to the sleeves 28 and 30, the sleeves 28 and 30 being adapted to be fixed, in adjusted positions, as by means of set screws 34 threaded downwardly through their top walls, into contact with the bracket arm 24.

Each rake assembly comprises a related sleeve 28, 30 on which are fixed laterally spaced perpendicular pendant parallel arms 35, located at the laterally inward end of the related one of the sleeves 28, 30, each of which is provided with a pair of aligned vertically spaced upper and lower holes 36 and 38, which accommodate upper and lower pivot pins 40 and 42, respectively.

A pair of similar upper and lower generally horizontal, and parallel spaced flat stabilizer bars 44 and 46, respectively, have journals 48, on their forward ends, which are positioned between the vertical arms 35 and turn on the upper and lower pivot pins 40 and 42, respectively. The upper stabilizer bar 44 has anchored to its top, intermediate its ends, as indicated at 50, the lower end of a suspension chain 52, whose links are selectively engageable over a hook 54 on a side of a horizontal suspension bar 56, which is fixed to and projects inwardly from the related sleeve. The adjustment of the chain 52 determines the overall spacing of the assembly from the ground and limits downward movement of the assembly toward the ground.

The stabilizer bars 44, 46 have journals 58, on their rear ends, which are journalled on vertically spaced upper and lower pivot pins 60 and 62, respectively, which extend through upper and lower holes 64 and 66, provided in the side flanges 68 of a vertical channel shield bracket 70. The bracket 70 is fixed to the laterally inward side of a cotton plant shield or fender 72.

The shield or fender 72 is vertical and longitudinally disposed, and is preferably long enough to extend from a point just forward of the drive wheels 16 of the tractor 10, to a point slightly beyond the rear edge of the front wheel 14. The shield 72 comprises a horizontal longitudinal support bar 74, of substantial thickness and rigidity, which is disposed in a vertical plane and extends the full length of the shield. The bar 74 has a laterally outwardly curved forward end portion 76. The shield bracket 70 is suitably fixed to the laterally outward surface of the support bar 74, at a location intermediate the ends of the straight portion of the bar 74, is braced thereto, as indicated at 78, and rises thereabove.

A stabilizing coil spring 80 is secured, at its lower end, as indicated at 82, to the lower rear part of the web 84 of the bracket 70, and has a hook 86, on its upper end, which is adapted to be engaged through selected one of the links of a chain 88, which is secured, at its upper end, as indicated at 90, to the rear end of the bar 56 on the related sleeve. The spring 80 serves to yieldably resist downward movement of the bracket 70, and hence of the shield 72, from elevated positions.

The shield 72 further comprises a relatively thin gauge plate 92, of the same length as and is coextensive with the support bar 74, and which is conformably engaged with the laterally inward surface of the support bar 74 and its curved forward end portion. Bolts 94 are extended through the shield plate 92, along its lower edge, and through the bar 74, for securing the shield plate in place on the bar 74, with the main part of the plate 92 rising above the bar 74. The plate 92 has a horizontal upper edge 96, which is downwardly curved at its forward end, as indicated at 98. The upper edge 96 is provided with a clearance notch 100, for the bracket 20 and the sleeves 28 and 30 thereon.

It is to be noted that the dependent arm 35 and bar 56 on each of the sleeves 28 and 30, the shield bracket 70, the stabilizer bars 44 and 46, spring 80, and chains 52 and 88, constitute means supportingly connecting the forward end of the shield 72 to the adjacent sleeve 28 or 30.

At a location between the shield bracket 70 and the rear end of the shield 72, the support bar 74 is provided with an arcuate pendant plate 102 which has a fixed radially outwardly extending horizontal stub axle 104, on which is securably journaled a ground-engaging gauge wheel 106, which normally is in supportive contact with the ground.

The laterally outward side flange 68 of the shield bracket 70 has fixed thereon, at its upper end, a laterally outwardly extending angle iron 108, having a pendant forward flange 110, on the front surface of which is fixed a forwardly extending horizontal cylindrical rake wheel carrying arm 112. A split sleeve 114 is slidably and rotatably engaged on the arm 112 for adjustment therealong, which has spaced flanges 116, on its separated edges, which are traversed by clamping bolts 118, adapted to be tightened to hold adjustments of the sleeve. On its laterally outward side, the sleeve 114 is provided with longitudinally spaced bosses 120, from which bolts 122 project through holes 124, provided in the ends of a clamping yoke 126. The yoke 126 has a V-shaped notch 128, in the laterally inward side, which is opposed to a V-shaped notch 130, in the laterally outward side of the material between the bosses 120, the bolts 122 being adapted to be tightened to clamp in the notches 128 and 130 a perpendicular rake wheel strut 132. The strut 132 has, at its lower end, a laterally outwardly and downwardly angled journal 134 which receives a stub shaft 136 which is secured in the journal by means of a nut 138, threaded on the stub shaft 136, at the side of the journal opposite to the disc 140 of a rake wheel 142.

The disc 140 of the rake wheel 142 is flat and is provided, near to its peripheral edge, with a concentric ring of equally circumferentially spaced holes 144, which receive bolts 146. As shown in FIGURES 5 and 6, rake fingers for the wheel 142 comprise V-shaped rods whose bight portions 148 embrace the securing bolts 146. The bolts 146 extend through clamping yokes 152 which straddle and embrace the fingers 154 of the V-shaped rods and clamp them to the laterally inward surfaces of the discs 140. The fingers 154 extend beyond the peripheral edge of the disc 140, and thereat are bent out of the plane of the disc to extend at radially outward and downward angles relative to the disc and substantially perpendicular to the ground. The disc 140 extends at an angle of about 45° to the horizontal, and, as shown in FIGURES 1 and 4, is disposed at a forward angle relative to a transverse vertical plane normal to the length of the straight portion of the shield 72.

As shown in FIGURE 1, the rake wheels 142 of the inboard rake assemblies A are at the laterally outward sides of their shields 72, and the rake wheels of the outboard rake assemblies B, at the laterally inward sides of their shields, the curved forward end portions 76 of the shields being in forwardly convergent relationship; the rake wheels 142 being in forwardly divergent relationship. Because of these arrangements, the inboard and outboard assemblies being properly spaced, the laterally outward surfaces of the shields engage the facing sides of adjacent cotton plant rows and push and hold them in directions away from each other, so as to expose cotton present on the ground at the feet of the plants, with the drive wheels 16 of the tractor 10 running on the ground exactly between the plant rows, and with the lower edges of the rake wheels 142 engaged with the ground, in front of the gauge wheels, close to the feet of the plants, and with the fingers 154 thereof in contact with the ground. This produces counterclockwise rotation of the rake wheels, as viewed in FIGURES 1 and 2.

In operation, as the tractor 10 moves forwardly, towing a cotton pick-up machine, not shown, the cotton at the feet of the plants is raked, at rearward and inward angles, away from the plants, and deposited in lines L which are spaced inwardly from the plants and at the opposite sides of the tractor drive wheels 16, so that these lines of cotton are readily picked up by the following pick-up machine.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A cotton rake comprising a bracket adapted to be fixed to the side member of a tractor frame, a horizontal arm extending perpendicularly and laterally outwardly from said bracket, a rake assembly mounted to said bracket arm, said assembly comprising a vertical longitudinal cotton plant-engaging shield having forward and rearward ends, and a rotary rake wheel having peripheral teeth operatively engaged with a ground surface, and mounting means for the assembly comprising a sleeve non-rotatably and slidably engaged on said bracket arm, a ground-engaging gauge wheel supporting the rear end of said shield, and means supportingly connecting the forward end of said shield to said sleeve.

2. The cotton rake according to claim 1 wherein said last-mentioned means includes a dependent arm on said sleeve, a vertical bracket fixed to said shield intermediate its ends, and stabilizing bars disposed between and pivotally connected to said arm and said vertical bracket.

3. A cotton rake comprising a tractor having a frame supported on a front steerable wheel and a pair of laterally spaced rear drive wheels, the drive wheels being positioned to engage the ground between different adjacent rows of cotton plants at opposite sides of the tractor, the tractor frame having side members, brackets fixed to the frame side members having horizontal arms extending perpendicularly and laterally outwardly therefrom, inboard and outboard rake assemblies mounted to said bracket arms, said inboard and outboard rake assemblies being similar and reversed with respect to each other, each of said assemblies comprising a vertical longitudinal cotton plant engaging shield having forward and rear ends, and a rotary rake wheel having peripheral teeth operatively engaged with the ground at the same side of the plants as the shields, mounting means for the assemblies comprising inboard and outboard sleeves non-rotatably and slidably engaged on the bracket means and adjustable therealong, a ground-engaging gauge wheel supporting the rear end of the shield of each of said assemblies, and means supportingly connecting the forward end of the shield of each of the assemblies to the adjacent sleeve.

4. A cotton rake comprising a tractor having a frame supported on a front steerable wheel and a pair of laterally spaced rear drive wheels, the drive wheels being positioned to engage the ground between different adjacent rows of cotton plants at opposite sides of the tractor, the tractor frame having side members, brackets fixed to the frame side members having horizontal arms extending perpendicularly and laterally outwardly therefrom, inboard and outboard rake assemblies mounted to said bracket arms, said inboard and outboard rake assemblies being similar and reversed with respect to each other, each of said assemblies comprising a vertical longitudinal cotton plant engaging shield having forward and rear ends, and a rotary rake wheel having peripheral teeth operatively engaged with the ground at the same side of the plants as the shields, and mounting means for the assemblies comprising inboard and outboard sleeves non-rotatably and slidably engaged on the bracket arms and adjustable therealong, upper and lower generally horizontal and parallel spaced stabilizing bars pivoted at their forward ends on each sleeve, a vertical shield bracket fixed to each shield to which the related stabilizing bars are pivoted at their rear ends.

5. A cotton rake comprising a tractor having a frame supported on a front steerable wheel and a pair of laterally spaced rear drive wheels, the drive wheels being positioned to engage the ground between different adjacent rows of cotton plants at opposite sides of the tractor, the tractor frame having side members, brackets fixed to the frame side members having horizontal arms extending perpendicularly and laterally outwardly therefrom, inboard and outboard rake assemblies mounted to said bracket arms, said inboard and outboard rake assemblies being similar and reversed with respect to each other, each of said assemblies comprising a vertical longitudinal cotton plant engaging shield having forward and rear ends, and a rotary rake wheel having peripheral teeth operatively engaged with the ground at the same side of the plants as the shields, and mounting means for the assemblies comprising inboard and outboard sleeves non-rotatably and slidably engaged on the bracket arms and adjustable therealong, upper and lower generally horizontal and parallel spaced stabilizing bars pivoted at their forward ends on each sleeve, a vertical shield bracket fixed to each shield to which the related stabilizing bars are pivoted at their rear ends, said shield brackets having fixed forwardly extending horizontal rake wheel carrier members, clamping sleeves longitudinally and rotatably engaged on said members, perpendicular struts secured to the clamping sleeves and having journals on their lower ends, said rake wheels having stub axles securably journaled through said journals.

6. A cotton rake comprising a tractor having a frame supported on a front steerable wheel and a pair of laterally spaced rear drive wheels, the drive wheels being positioned to engage the ground between different adjacent rows of cotton plants at opposite sides of the tractor, the tractor frame having side members, brackets fixed to the frame side members having horizontal arms extending perpendicularly and laterally outwardly therefrom, inboard and outboard rake assemblies mounted to said bracket arms, said inboard and outboard rake assemblies being similar and reversed with respect to each other, each of said assemblies comprising a vertical longitudinal cotton plant engaging shield having forward and rear ends, and a rotary rake wheel having peripheral teeth operatively engaged with the ground at the same side of the plants as the shields, and mounting means for the assemblies comprising spaced inboard and outboard sleeves non-rotatably and slidably engaged on the bracket arms and adjustable therealong, upper and lower generally horizontal and parallel spaced stabilizing bars pivoted at their forward ends on each sleeve, a vertical shield bracket fixed to each shield to which the related stabilizing bars are pivoted at their rear ends, said shield brackets having fixed forwardly extending horizontal rake wheel carrier members, clamping sleeves longitudinally and rotatably engaged on said members, perpendicular struts secured to the clamping sleeves and having journals on their lower ends, said rake wheels having stub axles securably journaled through said journals, said sleeves having rearwardly extending horizontal suspension members, first chains secured to the upper stabilizer arms and adjustably securable to the suspension members, stabilizing springs secured at their lower ends to the shield brackets, and adjustable length means securing the upper ends of the springs to the suspension members.

7. A cotton rake comprising a tractor having a frame supported on a front steerable wheel and a pair of laterally spaced rear drive wheels, the drive wheels being positioned to engage the ground between different adjacent rows of cotton plants at opposite sides of the tractor, the tractor frame having side members, brackets fixed to the frame side members having horizontal arms extending perpendicularly and laterally outwardly therefrom, inboard and outboard rake assemblies mounted to said bracket arms, said inboard and outboard rake assemblies being similar and reversed with respect to each other, each of said assemblies comprising a vertical longitudinal cotton plant engaging shield having forward and rear ends, and a rotary rake wheel having peripheral teeth operatively engaged with the ground at the same side of the plants as the shields, and mounting means for the assemblies comprising spaced inboard and outboard sleeves non-rotatably and slidably engaged on the bracket arms and adjustable therealong, upper and lower generally horizontal and parallel spaced stabilizing bars pivoted at their forward ends on each sleeve, a vertical shield bracket fixed to each shield to which the related stabilizing bars are pivoted at their rear ends, said shields having thereon ground-engaging gauge wheels.

References Cited in the file of this patent
UNITED STATES PATENTS

| | | |
|---|---|---|
| Re. 23,411 | Stenzel | Sept. 11, 1951 |
| 1,967,924 | Court | July 24, 1934 |
| 2,193,308 | Uyehara | Mar. 12, 1940 |
| 2,225,516 | Audilet | Dec. 17, 1940 |
| 2,633,790 | Bauer et al. | Apr. 7, 1953 |
| 2,710,519 | Winter | June 14, 1955 |
| 2,845,769 | Hintz et al. | Aug. 5, 1958 |